US011401862B2

(12) United States Patent
Amadon et al.

(10) Patent No.: US 11,401,862 B2
(45) Date of Patent: Aug. 2, 2022

(54) STATOR CONFIGURATION FOR GAS TURBINE ENGINE

(71) Applicant: United Technologies Corporation, Farmington, CT (US)

(72) Inventors: Colin G. Amadon, Kennebunk, ME (US); Michael C. Firnhaber, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 126 days.

(21) Appl. No.: 16/042,510

(22) Filed: Jul. 23, 2018

(65) Prior Publication Data
US 2020/0025077 A1    Jan. 23, 2020

(51) Int. Cl.
*F02C 7/04* (2006.01)
*F04D 29/54* (2006.01)
*F04D 19/00* (2006.01)

(52) U.S. Cl.
CPC .............. *F02C 7/04* (2013.01); *F04D 29/545* (2013.01); *F04D 19/002* (2013.01); *F05D 2220/36* (2013.01); *F05D 2240/12* (2013.01); *F05D 2260/606* (2013.01)

(58) Field of Classification Search
CPC ........ F02C 7/04; F04D 29/325; F04D 29/526; F04D 29/545; F04D 29/547; F01D 5/146; F01D 9/02; F01D 9/04; F01D 9/047; F01D 25/246
USPC .......................................................... 415/77
See application file for complete search history.

(56) References Cited

U.S. PATENT DOCUMENTS

| | | | | |
|---|---|---|---|---|
| 3,449,914 A * | 6/1969 | Brown | ...................... | F02K 1/15 405/215 |
| 3,494,129 A * | 2/1970 | Krebs | ................... | F04D 29/544 60/226.1 |
| 4,827,712 A * | 5/1989 | Coplin | ...................... | F02K 3/06 415/210.1 |
| 5,261,227 A * | 11/1993 | Giffin, III | ............. | F01D 17/162 60/226.1 |
| 5,680,754 A | 10/1997 | Giffin et al. | | |
| 6,145,300 A * | 11/2000 | Romani | ................... | F01D 5/141 60/226.1 |
| 6,438,941 B1 * | 8/2002 | Elliott | ................... | F01D 17/105 60/226.1 |
| 8,308,429 B2 * | 11/2012 | Walker | ................... | F04D 29/164 415/144 |
| 8,764,387 B2 | 7/2014 | Jordan et al. | | |
| 2005/0109013 A1 | 5/2005 | Eleftheriou et al. | | |
| 2008/0010970 A1 * | 1/2008 | Eleftheriou | .......... | F01D 25/162 60/226.1 |

(Continued)

OTHER PUBLICATIONS

European Search Report for Application No. 23.2.143304; dated Oct. 31, 2019.

*Primary Examiner* — David E Sosnowski
*Assistant Examiner* — Aye S Htay
(74) *Attorney, Agent, or Firm* — Cantor Colburn LLP

(57) ABSTRACT

A stator configuration for a gas turbine engine including a splitter segment. Also included is a first stator extending radially outwardly from the splitter segment. Further included is a second stator extending radially inwardly from the splitter segment, the splitter segment, the first stator and the second stator being a single, integrally formed structure.

18 Claims, 2 Drawing Sheets

(56) References Cited

U.S. PATENT DOCUMENTS

2013/0177410 A1 7/2013 Eleftheriou et al.
2015/0176432 A1 6/2015 Farah

* cited by examiner

200
STATOR CONFIGURATION FOR GAS TURBINE ENGINE

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a stator configuration for gas turbine engines.

In some gas turbine engines an airflow is to be radially split into multiple flow paths. A structure is needed to separate the airstream. Current structures require complex assemblies with multiple separate components that split the flow and manipulate the flow(s). Such structures are expensive and increase assembly complexity and overall weight of the system.

BRIEF DESCRIPTION

Disclosed is a stator configuration for a gas turbine engine including a splitter segment. Also included is a first stator extending radially outwardly from the splitter segment. Further included is a second stator extending radially inwardly from the splitter segment, the splitter segment, the first stator and the second stator being a single, integrally formed structure.

In addition to one or more of the features described above, or as an alternative, further embodiments may include that the splitter segment is configured to split an incoming fluid flow into a first, radially outer stream and a second, radially inner stream.

In addition to one or more of the features described above, or as an alternative, further embodiments may include that the splitter segment extends from a forward end to a rearward end, the first stator positioned closer to the forward end relative to the distance between the second stator and the forward end.

In addition to one or more of the features described above, or as an alternative, further embodiments may include that the splitter segment, the first stator and the second stator are formed from a single manufacturing process to form the single, integrally formed structure.

In addition to one or more of the features described above, or as an alternative, further embodiments may include that the splitter segment, the first stator and the second stator are multiple components joined together to form the single, integrally formed structure.

In addition to one or more of the features described above, or as an alternative, further embodiments may include a flange extending radially inwardly from the second stator, the flange providing a location for operative coupling of the stator configuration to a stationary structure of the gas turbine engine.

In addition to one or more of the features described above, or as an alternative, further embodiments may include a protrusion extending rearward from the flange to provide a locating feature during assembly and/or operation of the stator configuration with the gas turbine engine.

In addition to one or more of the features described above, or as an alternative, further embodiments may include that the rearward end of the splitter segment is in contact with a structure that at least partially defines the second, radially inner stream.

In addition to one or more of the features described above, or as an alternative, further embodiments may include that the splitter segment is in contact with a forward edge of a radial flow separation wall of the gas turbine engine.

In addition to one or more of the features described above, or as an alternative, further embodiments may include that an inner wall of the splitter segment defines an outer boundary of the second, radially inner stream at an axial location aligned with a rotor.

Also disclosed is a gas turbine engine including a fan section, a compressor section, a combustor section, and a turbine section. Also included is a stator configuration for radially separating a fluid flow into multiple streams. The stator configuration includes a splitter segment configured to split the fluid flow into a first, radially outer stream and a second, radially inner stream. The stator configuration also includes a first stator extending radially outwardly from the splitter segment. The stator configuration further includes a second stator extending radially inwardly from the splitter segment, the splitter segment, the first stator and the second stator being a single, integrally formed structure, the splitter segment extending from a forward end to a rearward end, the first stator positioned closer to the forward end relative to the distance between the second stator and the forward end.

In addition to one or more of the features described above, or as an alternative, further embodiments may include that the splitter segment, the first stator and the second stator are formed from a single manufacturing process to form the single, integrally formed structure.

In addition to one or more of the features described above, or as an alternative, further embodiments may include that the splitter segment, the first stator and the second stator are multiple components welded together to form the single, integrally formed structure.

In addition to one or more of the features described above, or as an alternative, further embodiments may include a flange extending radially inwardly from the second stator, the flange providing a location for operative coupling of the stator configuration to a stationary structure of the gas turbine engine.

In addition to one or more of the features described above, or as an alternative, further embodiments may include a protrusion extending rearward from the flange to provide a locating feature during assembly and/or operation of the stator configuration with the gas turbine engine.

In addition to one or more of the features described above, or as an alternative, further embodiments may include that the rearward end of the splitter segment is in contact with a structure that at least partially defines the second, radially inner stream.

In addition to one or more of the features described above, or as an alternative, further embodiments may include that the splitter segment is in contact with a forward edge of a radial flow separation wall of the gas turbine engine.

In addition to one or more of the features described above, or as an alternative, further embodiments may include that an inner wall of the splitter segment defines an outer boundary of the second, radially inner stream at an axial location aligned with a rotor.

In addition to one or more of the features described above, or as an alternative, further embodiments may include that the forward end of the splitter segment is shaped to receive flow from a range of angles.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
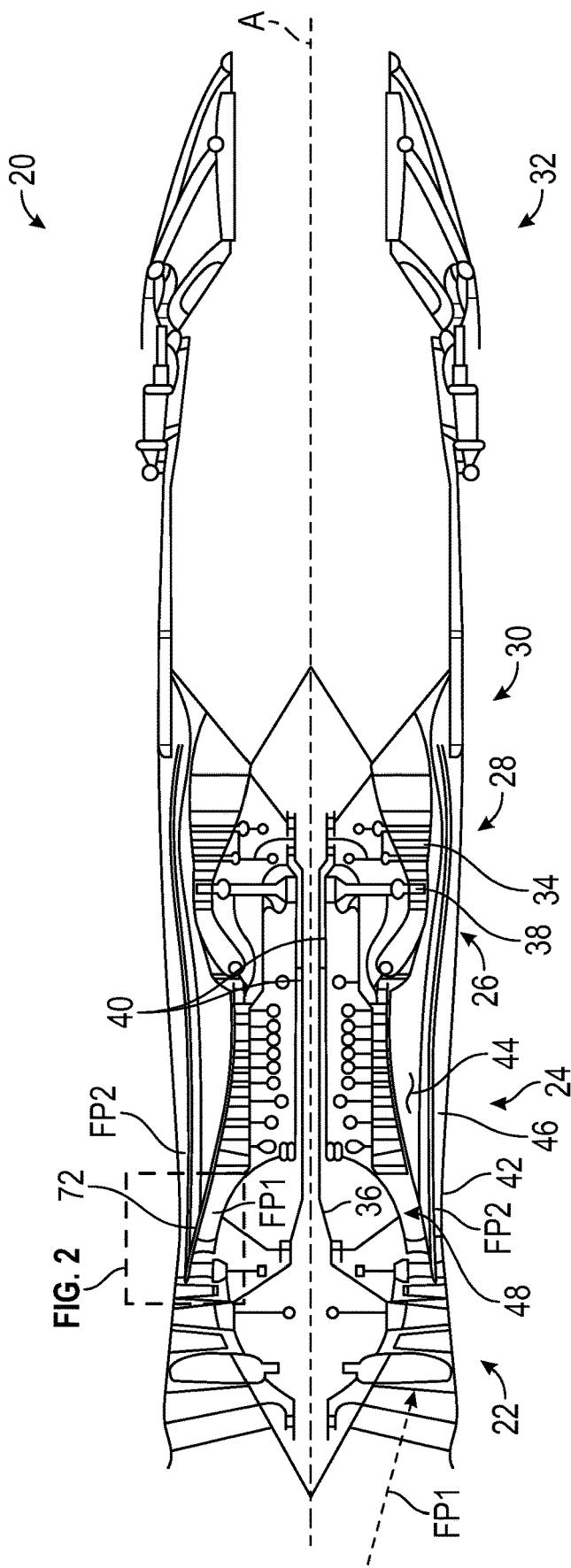
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

A radial flow separation wall 72 is configured to separate a first flow path FP1 of the gas turbine engine 20 from a second flow path FP2 of the gas turbine engine 20. The first flow path FP1 flows through blades of the gas turbine engine 20 and the second flow path FP2 flows through guide vanes, also referred to as stators, of the gas turbine engine 20. The first flow path FP1 may be the core flow path 48 and the second flow path FP2 may be the secondary flow path. It is understood that embodiments disclosed herein are also applicable to gas turbine engines with more than two flow paths. The radial flow separation wall 72 may be composed of one or more components of the gas turbine engine 20.

Figure 2:
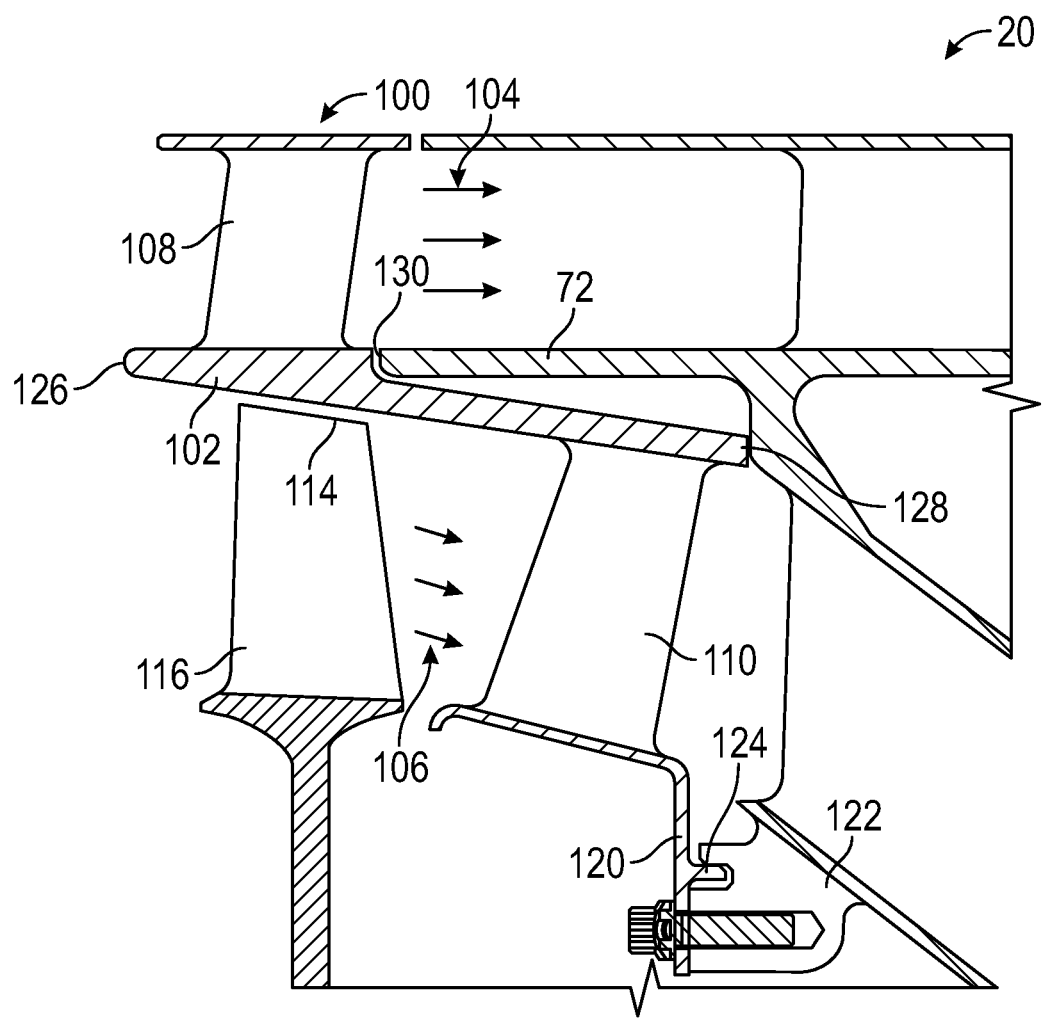
FIG. 2 is a partial cross-sectional view of a portion of the gas turbine engine, illustrating a stator configuration.

Referring now to FIG. 2, it is to be appreciated that the embodiments of a stator configuration 100 disclosed herein may be utilized in any location of the gas turbine engine 20 that requires splitting of a flow where the incoming air is not substantially parallel to the engine axis, where this flow needs to be straightened into the outer stream, and additional work is to be done by subsequent rotor 116 in the inner stream. The stator configuration 100 in the illustrated embodiment is located just upstream of the radial flow separation wall 72 described above, but it is to be understood that the illustrated location is merely one example.

The stator configuration 100 includes a splitter segment 102 that separates a bypass stream 104 from an inner stream 106. A first set of stators (only one of which is illustrated) 108 is located radially outwardly of the splitter segment 102 and within the bypass stream 104. In some embodiments, one or both sets of stators 108 are variable vanes that may be adjusted based on operating conditions. A second set of stators (only one of which is illustrated) 110 is located radially inwardly of the splitter segment 102 and within the inner stream 106. The splitter segment 102 defines a radially outward boundary of the inner stream 106, such that an outer tip 114 of a rotor 116 passes in close proximity with the splitter segment 102 to extract work from the fluid flowing through the inner stream 106.

As shown, the second set of stators 110 that are located radially inwardly of the splitter segment 102 are located downstream of the rotor 116. In such embodiments, the first set of stators 108 is located upstream relative to the second set of stators 110.

The stator configuration 100 may be operatively coupled to any substantially stationary component or structure of the gas turbine engine 20. In the illustrated embodiment, a flange 120 extends radially inwardly away from the second set of stators 110 and is mechanically fastened to a radially inner wall 122 that defines the inner stream 106. However, it is to be understood that additional and/or alternative relatively stationary structural locations may be utilized as the coupling location for the stator configuration 100. A locating feature, such as protrusion 124 extending from the flange 120 is provided in some embodiments to assist with proper positioning of the stator configuration 100.

The stator configuration 100 is a single, integrally formed structure that is not intended to be repeatedly disassembled and assembled. In other words, the stator configuration 100 is initially manufactured to be a single, integrally formed structure or may be comprised of multiple components, but with the components welded together or otherwise permanently secured to each other in a manner that does not easily facilitate disassembly. This differs from other assemblies that may have multiple components operatively coupled with mechanical fasteners, such as bolts or the like. In some embodiments, the entire assembly may be segmented circumferentially.

As described above, the stator configuration 100 may be operatively coupled to one or more parts of the gas turbine engine 20 during assembly. The splitter segment 102 extends in a substantially axial direction from a forward end 126 to a rearward end 128. The forward end 126 of the splitter segment 102 is illustrated as having a substantially constantly curving geometry, however, it is to be appreciated that different "nose" geometries may be utilized to capture flow approaching at various angles (e.g., a range of angles). In the illustrated embodiment, the rearward end 128 of the splitter segment 102 is in contact with a part of a structure that at least partially defines the radially inner stream 106 and another portion of the splitter segment 102 is in contact with a forward edge 130 of the radial flow separation wall 72 of the gas turbine engine 20. In such an embodiment, a seal may be disposed between the rearward end 128 of the splitter segment 102 and the forward edge 130 of the radial flow separation wall 72. Although illustrated as having the above-described contact locations, it is to be appreciated that alternative contact surfaces may be employed.

The embodiments of the stator configuration 100 described herein provide a double-stacked stator that is formed of a single, integrally formed structure and serves as an outer shroud for a rotor. By eliminating components and fastening tools, the embodiments provide a lighter, simpler structure and reduces flow leakage at the outer portion of the rotor.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator configuration for a gas turbine engine comprising:
    a splitter segment, the splitter segment extending from a forward end to a rearward end;
    a forward most first stator extending radially outwardly from the splitter segment, the forward most first stator being completely located downstream from the forward end of the splitter segment;
    a forward most second stator extending radially inwardly from the splitter segment, the splitter segment, the forward most first stator and the forward most second stator being formed as a single, integrally formed structure, the forward most first stator positioned closer to the forward end relative to a distance between the forward most second stator and the forward end and the forward most second stator positioned closer to the rearward end relative to a distance between the forward most first stator and the rearward end; and
    a flange extending radially inwardly from the forward most second stator, the flange providing a location for operative coupling of the stator configuration to a stationary structure of the gas turbine engine.

2. The stator configuration of claim 1, wherein the splitter segment is configured to split an incoming fluid flow into a first, radially outer stream and a second, radially inner stream.

3. The stator configuration of claim 2, wherein the rearward end of the splitter segment is in contact with a structure that at least partially defines the second, radially inner stream.

4. The stator configuration of claim 1, wherein the splitter segment, the forward most first stator and the forward most second stator are formed from a single manufacturing process to form the single, integrally formed structure.

5. The stator configuration of claim 1, wherein the splitter segment, the forward most first stator and the forward most second stator are multiple components joined together to form the single, integrally formed structure.

6. The stator configuration of claim 1, further comprising a protrusion extending rearward from the flange to provide a locating feature during assembly and/or operation of the stator configuration with the gas turbine engine.

7. The stator configuration of claim 1, wherein the splitter segment is in contact with a forward edge of a radial flow separation wall of the gas turbine engine.

8. The stator configuration of claim 1, wherein an inner wall of the splitter segment defines an outer boundary of a second, radially inner stream at an axial location aligned with a rotor.

9. The stator configuration of claim 1, wherein the forward most first stator is completely located upstream from the forward most second stator.

10. A gas turbine engine comprising:
    a fan section;
    a compressor section;
    a combustor section;
    a turbine section; and
    a stator configuration for radially separating a fluid flow into multiple streams, the stator configuration comprising:
    a splitter segment configured to split the fluid flow into a first, radially outer stream and a second, radially inner stream;
    a forward most first stator extending radially outwardly from the splitter segment;
    a forward most second stator extending radially inwardly from the splitter segment, the splitter segment, the forward most first stator and the forward most second stator being formed as a single, integrally formed structure, the splitter segment extending from a forward end to a rearward end, the forward most first stator positioned closer to the forward end relative to a distance between the forward most second stator and the forward end and the forward most second stator positioned closer to the rearward end relative to a distance between the forward most first stator and the rearward end, and the forward most first stator being completely located downstream from the forward end of the splitter segment; and a flange extending radially inwardly from the forward most second stator, the flange providing a location for operative coupling of the stator configuration to a stationary structure of the gas turbine engine.

11. The gas turbine engine of claim 10, wherein the splitter segment, the forward most first stator and the forward most second stator are formed from a single manufacturing process to form the single, integrally formed structure.

12. The gas turbine engine of claim 10, wherein the splitter segment, the forward most first stator and the forward most second stator are multiple components welded together to form the single, integrally formed structure.

13. The gas turbine engine of claim 10, further comprising a protrusion extending rearward from the flange to provide a locating feature during assembly and/or operation of the stator configuration with the gas turbine engine.

14. The gas turbine engine of claim 10, wherein the rearward end of the splitter segment is in contact with a structure that at least partially defines the second, radially inner stream.

15. The gas turbine engine of claim 10, wherein the splitter segment is in contact with a forward edge of a radial flow separation wall of the gas turbine engine.

16. The gas turbine engine of claim 10, wherein an inner wall of the splitter segment defines an outer boundary of the second, radially inner stream at an axial location aligned with a rotor.

17. The gas turbine engine of claim 10, the forward end of the splitter segment shaped to receive flow from a range of angles.

18. The gas turbine engine of claim 10, wherein the forward most first stator is completely located upstream from the forward most second stator.

* * * * *